United States Patent [19]
Chauvin

[11] Patent Number: 5,198,928
[45] Date of Patent: Mar. 30, 1993

[54] LIGHT WEIGHT BINOCULAR HELMET VISOR DISPLAY

[75] Inventor: Dewey J. Chauvin, Simi Valley, Calif.

[73] Assignee: Hughes Aircraft Company, Los Angeles, Calif.

[21] Appl. No.: 721,724

[22] Filed: Jun. 26, 1991

[51] Int. Cl.⁵ .......................... G02B 5/30; G02B 27/26
[52] U.S. Cl. .................................. 359/465; 359/495; 359/496; 359/630
[58] Field of Search ................. 359/73, 464, 465, 487, 359/488, 495, 496, 497, 630, 409; 353/7, 8, 20

[56] References Cited

U.S. PATENT DOCUMENTS

| | | | |
|---|---|---|---|
| 2,182,142 | 12/1939 | Ball et al. | 359/496 |
| 2,449,287 | 9/1948 | Flood | 359/495 |
| 2,811,077 | 10/1957 | Wiemer et al. | 359/497 |
| 4,559,556 | 12/1985 | Wilkins | 359/465 |
| 4,623,219 | 11/1986 | Trias | 359/465 |
| 4,670,744 | 6/1987 | Buzak | 359/73 |

FOREIGN PATENT DOCUMENTS

WO85/04961 11/1985 World Int. Prop. O. ............ 359/13

Primary Examiner—Bruce Y. Arnold
Assistant Examiner—Martin Lerner
Attorney, Agent, or Firm—L. A. Alkov; W. K. Denson-Low

[57] ABSTRACT

A binocular, stereoscopic helmet visor display is described, wherein a polarization x-prism is used to separate the left eye imagery from the right eye imagery when each channel has a unique polarization. Separate image sources generate the left and right eye imagery, and the respective left and right image light is passed through polarizers so that the respective left and right image light is of opposite polarizations. The polarized left and right image light is combined through a common optical relay and passed to the x-prism which separates the polarized light, sending the "p" polarized light out one channel to one eye, and the "s" polarized light out the other channel to the other eye. Once the channels are separated, the images are projected to the observer's eyes.

11 Claims, 2 Drawing Sheets

LIGHT WEIGHT BINOCULAR HELMET VISOR DISPLAY

BACKGROUND OF THE INVENTION

The present invention relates to helmet visor displays ("HVDs").

Helmet mounted visor displays can find application in helicopter as well as for fixed-wing applications as well as in the simulation and training field. This market is constantly expanding and has a high interest in true stereoscopic displays, which present independent images to each eye. A true binocular display must provide the observer with a different image for each eye. Stereoscopic cues are derived by the viewer by the prospective, point of view, differences between the images.

All current stereoscopic HVDs use two separate channels with severe weight penalties. Conventional binocular HVDs have used two separate optical relay assemblies to provide the independent images. These units require two sets of relay optics which increases unit weight and costs. Other techniques include the use of synchronized shutters. A shutter is placed over each eye. The imagery on the CRT is alternated between a left and right viewed scene. The shutters are then synchronized to the respective alternating scene. This approach limits the frame rate, apparent brightness while increasing complexity, weight and costs.

SUMMARY OF THE INVENTION

By employing an x-prism which splits the polarization from the image sources apart, sending one to the left and the other to the right, the second optical relay assembly can be eliminated. If the right eye image source is polarized opposite to the left eye polarization, both the left and right imagery can be sent through the same relay assembly, then separated by the new prism. Therefore, helmet visor display equipped with this polarization x-prism are 50% lighter than with a conventional biocular HVD. One only needs to add a second CRT or other image source and a polarizing beamsplitter to any current biocular HVD design.

A binocular HVD in accordance with the invention provides the observer with a different image for each eye, and comprises a first image source means for producing image light which is "p" polarized, and a second image source for producing image light which is "s" polarized.

Means are provided for directing the "p" polarized and "s" polarized light onto an input face of a polarization x-prism. The x-prism functions as a channel separator to separate the incident "p" and "s" polarized image light into respective right and left eye channels, wherein either the "p" or "s" polarized image light is directed to the observer's left eye, and the other of the "p" or "s" polarized image light is directed to the observer's right eye.

In the preferred embodiment, the polarization x-prism comprises four triangular prism elements, characterized in that each prism element has formed on one leg a polarization sensitive coating which predominately reflects the "s" polarization incident light and transmits the "p" polarization light, and on another leg a half wave plate is formed which converts the polarization of the light incident thereon. The four triangular elements are bonded together with their respective legs joined such that a coating is next to a half-wave plate.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
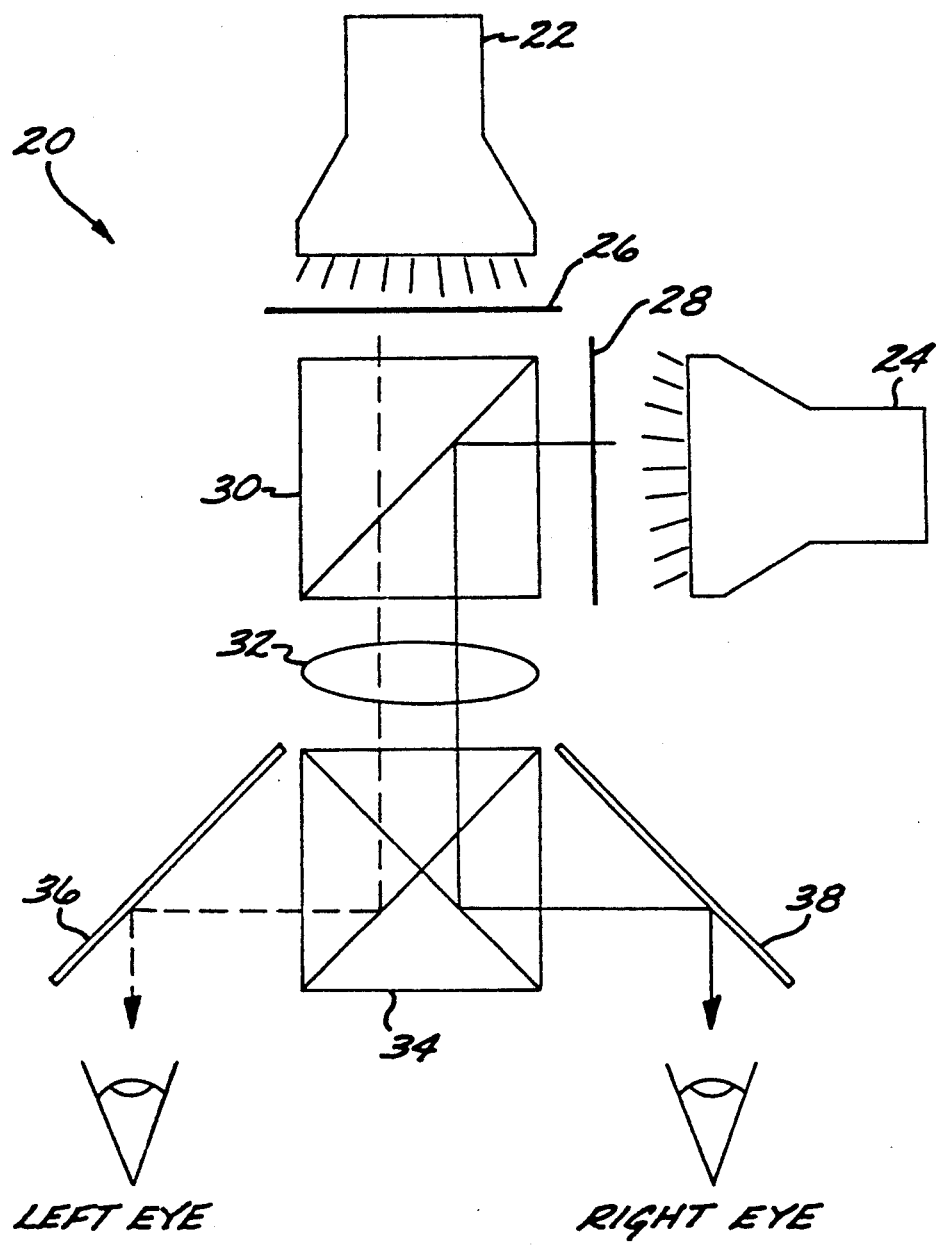
FIG. 1 is a schematic diagram of an HVD employing the invention.

A light weight binocular HVD 20 in accordance with the invention is shown in FIG. 1. The HVD 20 uses a unique property of the "High Efficiency Low Glare X-Prism," described in the co-pending patent application of the same title, U.S. Ser No. 07/721,725, filed Jun. 21, 1991, 1991, by Ronald G. Hegg and assigned to a common assignee as the present application, to separate the left and right images from a common relay assembly. In the embodiment of FIG. 1, two CRTs 22 and 24 or other image sources are used to provide the scene to the observer. The light from one image source is polarized "p" and the light from the other source is polarized "s" by passing through a ¼ wave plate or polarizing beamsplitter. In this example, the left eye is "p" polarized while the right channel is "s" polarized. Thus, in this embodiment, the image light from CRT 22 is passed through a ¼ wave plate 26 constructed to transmit the "s" polarized light component and to reflect the "p" polarized light component. The image light from CRT 24 is passed through a ¼ wave plate 28 constructed to transmit the "p" polarized light and to reflect the "s" polarized light. The resulting polarized left and right images are then projected through a common relay optical assembly comprising right angle beamsplitter 30 and lens 32 to a polarization x-prism 34 of the type described in the above-referenced pending patent application.

Figure 2:
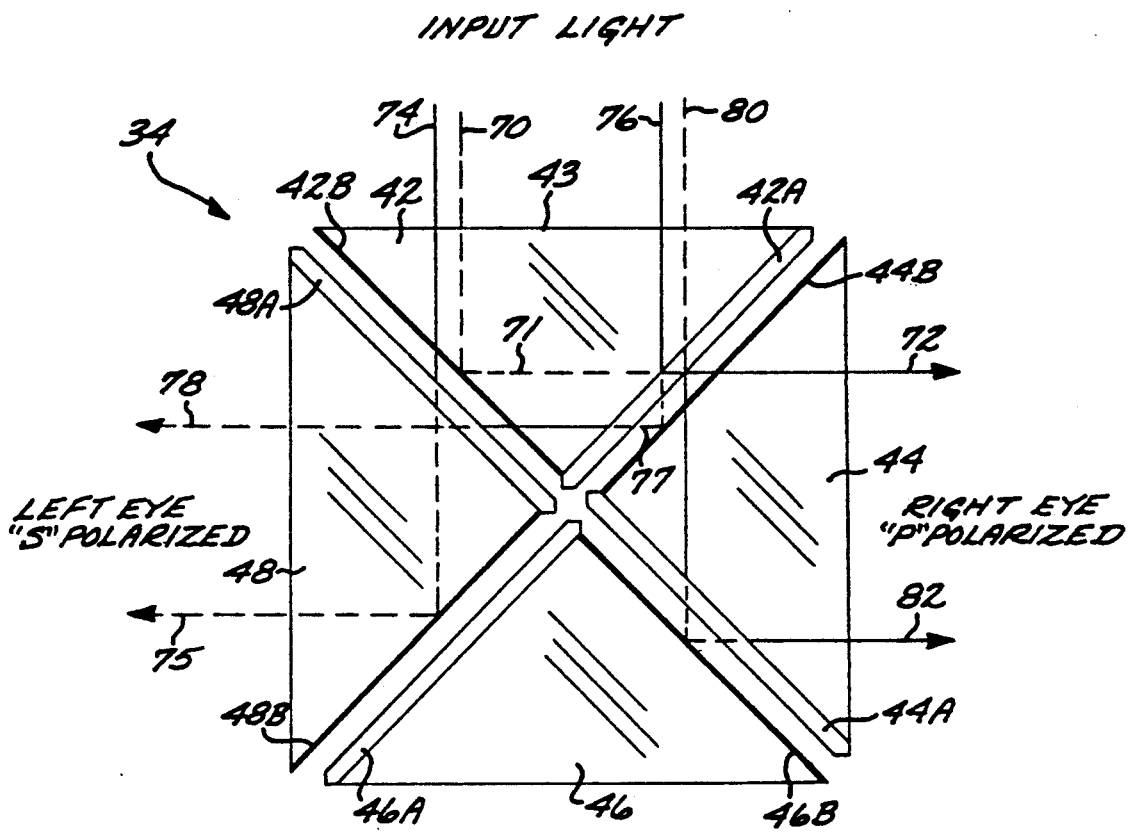
FIGS. 2 and 3 illustrate the polarization x-prism employed in the HVD of FIG. 1.

The x-prism 34 has the unique ability to separate the polarized light sending nearly all "p" light out one channel and nearly all "s" light out the other, as described more fully in connection with FIG. 2. Thus, the prism 34 works like a channel separator.

Lens 32 is a graphical representation of the common relay assembly. The term "common" refers to the fact that both the left eye and right eye are sharing the same optical relay assembly. "Relay" describes a type of optical assembly to transfer an image to the observer while correcting for optical aberration. If the designer were to make the system a direct view apparatus, the relay assembly could be omitted entirely. The relay assembly may be one lens or any number of lenses. In theory, any group of lenses can mathematically be represented by one single lens even though physical manufacturing constraints prohibit this in practice. The function of the relay assembly 32, in this application, is to transfer the image of the CRTs 22 and 24 to the observer. The relay is the assembly which adds the optical power, makes the image appear larger or smaller, and makes the image appear to be close to or far from the observer. The relay optics in the HVD assembly as shown is what "focuses" the image to the observer. Typical HVD units have a relay system which make the CRTs appear to be "focused" at or near infinity. The relay assembly 32 can take various forms to provide the designer with a variety of displays.

Once the channels are separated by the x-prism 34, the respective images are then projected via the mirrors or optical combiners 36 and 38 to the observer's eyes. Another polarizing plate may be placed after the beamsplitter assembly to filter out any undesired crosstalk. Crosstalk is the appearance of the opposite channel's signal in the primary channel. For example, an inefficient coating may allow a ghost image of the left channel to appear in certain regions of the right channel. The amount of crosstalk is dependent on the FOV and coating quality. This crosstalk would be unacceptable to most viewers. To alleviate the crosstalk, one can simply add a polarized filter in between the x-prism 34 elements 44 and 48 (FIG. 2) and the viewer. The most likely location would be between the mirrors 36 and 38 and the x-prism 34. The filter could even be a coating applied directly to the exiting faces of the beamsplitter elements 44 and 48 (FIG. 2). The polarized filter would allow light of only one polarization to pass through while attenuating all the other polarization. Thus, a "P" polarized filter would be placed in the light path of rays 78 and 75 (FIG. 2). This would guarantee that only "S" polarized light would be transmitted to the left eye. The opposite arrangement would be made for the right eye, (rays 72 and 82 in FIG. 2). These filters would be used to extinguish the opposing channel from appearing in the wrong eye.

Figure 3:
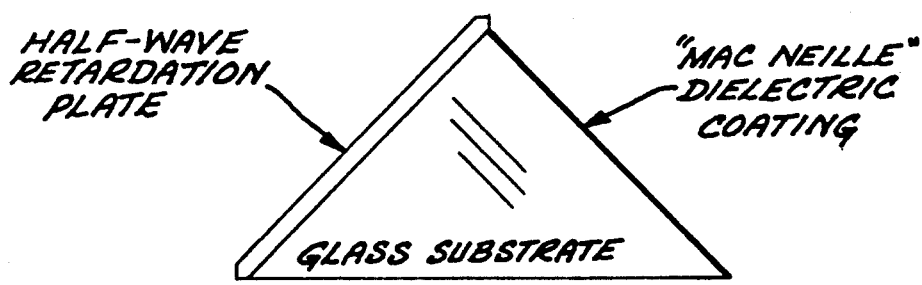

The polarization x-prism 34 is shown in more detail in FIGS. 2 and 3. The x-prism 34 comprises four similar right-angle triangles 42, 44, 46, 48, each having a "MacNeille" type dielectric coating formed on one leg and a half-wave plate bonded to the other leg. Thus, the respective legs carrying the coating and half-wave plate meet to define a right angle.

A "half-wave plate" is a specific type of optical retarder. In general an optical retarder causes one of the polarizations of a beam of light to lag in phase behind the other. Upon emerging from the retarder, the relative phase of the two components is different than it was initially and, thus, the polarization is different as well. Specifically, a half-wave retarder introduces a relative phase difference of $\pi$ radians or 180° between the two waves. This has the effect of changing one polarization into another (i.e., "p" into "s" and "s" into "p"). See *Optics*, by Hecht and Zajac, 1976, pp. 246-248.

In order to make one state lag behind the other, the material must have two different optical indices in the two directions. Such a material is called birefringent.

As it turns out, actual materials that are used to make retarders are sensitive both to thickness and wavelength. Therefore, a specific thickness of material will be a half-wave plate for a specific wavelength. In the case of an exemplary helmet visor display, which is basically monochromatic, the light is typically centered around 543 nm which is the main peak of the CRT phosphor (P43), and hence the half-wave plate is tuned to about this wavelength.

A half-wave plate is usually made from a thin slice of mica which is cleaved from the crystal. It can have a minimum thickness of about 60 microns. Therefore, in order to make a half-wave plate, the thickness of the material must conform to the following equation:

$$d(nO-ne) = (2m+1)\lambda/2$$

where d = the thickness along the ray
n0, ne = the two indices of the material
m = the order (0,1,2,3, . . .)
$\lambda$ = the wavelength of light Mica has an index of 1.599 and 1.594. Therefore, if the 0th order is chosen along with the wavelength of 0.543 microns, the thickness works out to be 108.60 microns. Now since the material is actually situated 45° relative to the nominal input beam, the thickness of the plate would be only 76.79 microns.

The "MacNeille" type coating is a polarization-sensitive coating characterized in that incident "s" polarization light is predominately reflected and the incident "p" polarization light is transmitted. MacNeille type coatings are described, for example, in the "Handbook of Optics," Walter G. Driscoll, Ed., 1978, at pages 8-74 and 8-75.

The four triangular elements 42, 44, 46 and 48 are typically made of glass, although other lens materials such as plastics may also be used. Schott SF6 or SFL6 is the type of glass typically used since it has a high index ($\sim 1.8$). High index glass works best for a wide FOV visor display. For a narrower FOV display, other glasses such as Schott BK7 (index $\sim 1.52$) can be used.

When light is incident on face 43 of triangle 42, the "s" polarization comprising incident ray 70 on the left side is reflected by the MacNeille coating 42B to the right (ray 71). This light passes through the half-wave plate 42A, is converted to "p" polarized light and is transmitted through the right side coating 44B of triangle 44 and out of the prism (exit ray 72). The "p" polarized input light component, ray 74, entering the prism 34 on the left side passes through the left side coating 42B, is converted to "s" polarization light by means of the half-wave plate 48A of triangle 48 and reflects off the bottom-left coating 48B to the left as exit ray 75.

The "p" polarized light entering the prism 34 from the right side of triangle 42 as ray 76 passes through the half-wave plate 42A of the triangle 42 and is converted to "s" polarized light which is reflected to the left (ray 77). This ray passes through the half-wave plate 42A and is converted to "p" polarized light, which passes through the coating 42B of triangle 42, is converted to "s" polarized light through the half-wave plate 48A and emerges from the prism 34 as exit ray 78.

The "s" polarized light (ray 80) incident on the right side of face 43 of triangle 42 is converted into "p" polarized light by the half-wave plate 42A, passes through triangle 44, is converted to "s" polarized light by plate 44A which is reflected from the coating 46B, converted to "p" polarized light which then exits the prism as exit ray 82.

It will be appreciated by those skilled in the art that the prism 34 need not include four triangular pieces, since the triangular piece 46 may be omitted to save weight. In this case, the coatings 46A and 46B could then be applied to the outer surfaces of coatings 44A and 44B, respectively.

With the polarization prism 34, virtually no light will pass straight through the cube producing both an efficient x-prism and a low-glare source. However, such a coating is only theoretically 100% efficient at 0° incidence angle. The incidence angle is the angle of the incident ray with respect to the normal to the face of the prism. At other angles, this efficiency falls off. In fact, the efficiency can be expressed as the following equation:

$$\mathit{eff} = (R_s T_p + R_p T_s)/2$$

where
- $R_2$ = Reflection of "s"
- $R_p$ = % Reflection of "p"
- $T_s$ = % Transmission of "s"
- $T_p$ = % Transmission of "p"

If $R_s$ and $T_p$ are 100%, the efficiency will be 50%. However, for $R_s$ and $T_p$ equal to 80% (and $R_p$ and $T_s$ equal to 20%), the efficiency drops to 34%.

Using such a definition of efficiency, the proper "MacNeille" coating can be designed with the following exemplary quarter-wave stack information. The quarter-wave stack of any interference dielectric coating is a preferred thickness and structure whether two materials (designated by H and L referring to the high and low index material), are layered alternately so their effective optical thickness is a quarter of the wavelength of the nominal light radiation. A certain set of HL quarter-wave layers can be so configured to give a "MacNeille" coating.

Glass (HL)4(LH)12 Glass where:
- Index of Glass = 1.815 (SFL6 Schott Glass)
- H = 2.1
- L = 1.62

Larger fields of view ("FOV") for the HVD will reduce the efficiency of the ability of the prism to fully separate the two images. The coatings (both the $\frac{1}{4}$ wave plates and the dielectric coatings) applied to the prism elements are angularly dependent. The coating is very efficient for near normal angles of incidence while nearly non-existent at 1° angle of incidence. This phenomenon is due to the fact the coatings are designed as $\frac{1}{4}$ wave stacks of varying indexes of refraction. Since the stacks have a finite thickness, any ray of light entering the stack at an angle greater or lesser than the design angle, the coating will not reflect as efficiently. The actual loss depends on many different variables, the wavelength and bandwidth of light, the purity of the coating materials, the $\frac{1}{4}$ wave thickness accuracy and uniformity, as well as the quality of the prism surface and index of refraction. Based upon current technology and practice, Fields of View of 60° appear to be theoretically possible. With better controls and coating practices, even greater FOVs may be possible in the future. Varying the optical relay system, for instance adding a second relay system after the prism, could greatly increase the FOV achievable. Coating techniques are continuously expanding the angular bandwidth which is achievable.

It is understood that the above-described embodiment is merely illustrative of the possible specific embodiments which may represent principles of the present invention. Other arrangements may readily be devised in accordance with these principles by those skilled in the art without departing from the scope and spirit of the invention. For example, the beamsplitter 30 as shown merely reflects 50% of the light at 90° while transmitting 50% of all light straight through regardless of polarization. However, the polarizers 26 and 28 may be omitted if the beamsplitter 30 is replaced with a right angle polarized beamsplitter. This polarized prism would make use of the "MacNeille" coating so that only the appropriate polarization is passed. If the coating applied to surfaces 42B, 44B, 46B and 48B of the x-prism 34 were applied to the seam of the polarized prism, the filters would not be required. The prism itself would filter the two appropriate polarizations. "P" polarized light would be transmitted and "S" polarized light would be reflected. Thus, in FIG. 1, the "P" and "S" light from CRT 22 would enter the right angle polarized prism. The "P" polarized light would transmit straight through to the lens assembly 32. The "S" light would then reflect at the seam line and exit the left side of the polarizing beamsplitter replacing beamsplitter 30. "P" light from CRT 24 would transmit straight through the right angle polarized prism, exiting the left side. The "P" light of CRT 24 and the "S" light of the CRT 22 would both be visible out the left side of prism 30. The "S" light from CRT 24 would be reflected down through the bottom of the prism to the lens assembly 32. The use of the upper prism as a "MacNeille" right-angle, polarizing prism would save the weight of the two polarizers 26 and 28.

What is claimed is:

1. A binocular helmet visor display (HVD) for providing the observer with a different image for each eye, comprising:
   a first image source means for producing image light which is "p" polarized;
   a second image source for producing image light which is "s" polarized;
   means for directing said "p" polarized and "s" polarized light onto an input face of a polarization x-prism; and
   wherein said x-prism functions as a channel separator to separate said incident "p" and "s" polarized image light into respective right and left eye channels, wherein either the "p" or "s" polarized image light is directed toward the observer's left eye, and the other of the "p" or "s" polarized image light is directed toward the observer's right eye.

2. The HVD of claim 1 wherein said x-prism comprises four triangular prism elements, characterized in that each prism element has formed on one leg a polarization sensitive coating which predominately reflects the "s" polarization incident light and transmits the "p" polarization light, and on another leg a half wave plate is formed which converts the polarization of the light incident thereon, and wherein said four triangular elements are bonded together with their respective legs joined such that a coating is next to a half-wave plate.

3. The HVD of claim 2 wherein said coating comprises a MacNeille type dielectric coating.

4. The HVD of claim 2 wherein the legs of each triangular prism element which carry said respective coating and plate define a right angle.

5. The HVD of claim 1 wherein said first image source means comprises a first image generator and means for polarizing the light from said first generator as "p" polarized light, and wherein said second image source means comprises a second image generator and means for polarizing the light from said second generator as "s" polarized light, and wherein said means for directing comprises a right angle beamsplitter/combiner.

6. The HVD of claim 1 wherein said first image source means comprises a first image generator for generating unpolarized first image light, said second image source means comprises a second image generator for generating unpolarized second image light, and a right angle polarized beamsplitter for combining and transmitting to said x-prism only the "p" polarized light component of said first image light and only the "s" polarized light component of said second image light.

7. A binocular helmet visor display (HVD) for providing the observer with a different image for each eye, comprising:
- a first image source means for producing image light which is "p" polarized;
- a second image source for producing image light which is "s" polarized;
- means for combining the light from said first and second image sources into a single channel and directing said combined light onto a polarization sensitive channel separator;
- said channel separator comprising means for separating the polarized light, sending nearly all the "p" polarized light to a first eye channel and sending nearly all the "s" polarized light to a second eye channel, wherein said channel separator comprises a polarization x-prism comprising four triangular prism elements, characterized in that each prism element has formed on one leg a polarization sensitive coating which predominately reflects the "s" polarization incident light and transmits the "p" polarization lgiht, and on another leg a half wave plate is formed which converts the polarization of the light incident thereon, and wherein said four triangular elements are bonded together with their respective legs joined such that a coating is next to a half-wave plate; and
- means for projecting the respective light in said first eye channel toward a first one of the user's eyes and for projecting the respective light in said second eye channel toward a second one of the user's eyes.

8. The HVD of claim 7 wherein said coating comprises a MacNeille type dielectric coating.

9. The HVD of claim 7 wherein the legs of each triangular prism element which carry said respective coating and plate define a right angle.

10. The HVD of claim 7 wherein said first image source means comprises a first image generator and means for polarizing the light from said first generator as "p" polarized light, and wherein said second image source means comprises a second image generator and means for polarizing the light from said second generator as "s" polarized light, and wherein said means for combining comprises a right angle beamsplitter/combiner.

11. The HVD of claim 7 wherein said first image source means comprises a first image generator for generating unpolarized first image light, said second image source means comprises a second image generator for generating unpolarized second image light, and said combining means comprises a right angle polarized beamsplitter for combining and transmitting to said channel separator only the "p" polarized light component of said first image light and only the "s" polarized light component of said second image light.

* * * * *